Feb. 27, 1934.  A. D. EPLETT  1,949,150
SAFETY VALVE
Filed March 19, 1931
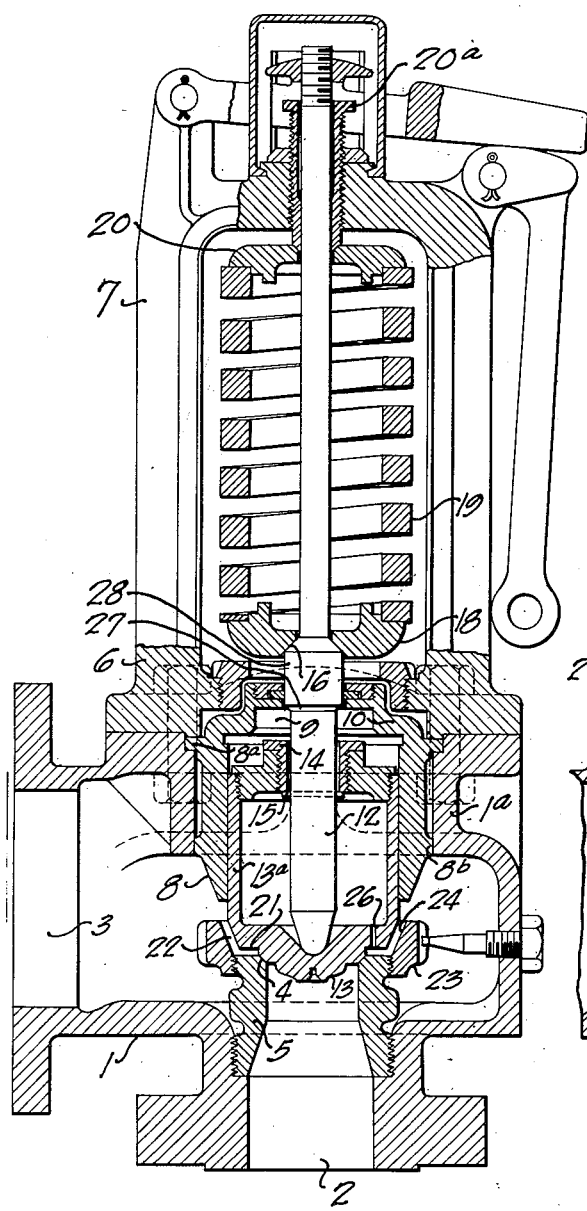
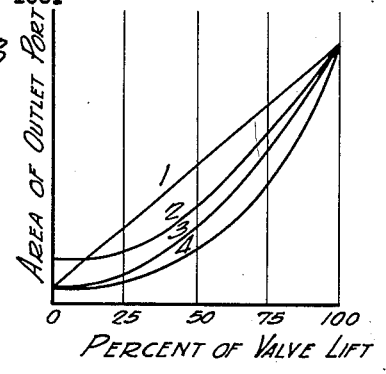
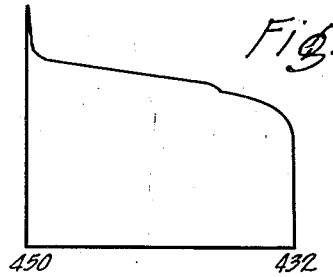
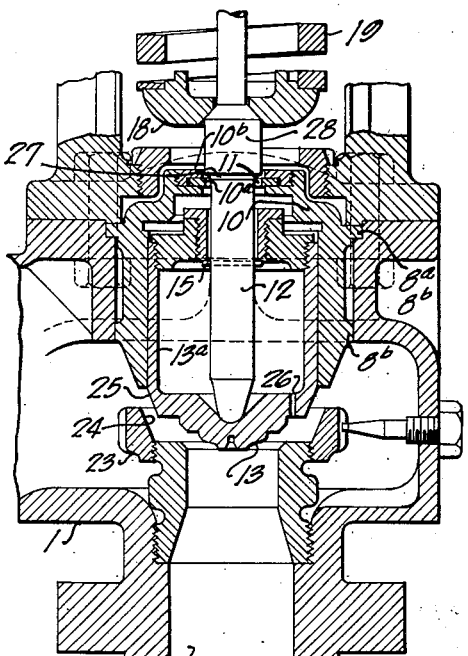
INVENTOR
ALBERT D. EPLETT
by Roberts Cushman & Woodberry
ATTYS Patented Feb. 27, 1934

1,949,150

UNITED STATES PATENT OFFICE 1,949,150

SAFETY VALVE

Albert D. Eplett, Bridgeport, Conn., assignor to Consolidated Ashcroft Hancock Company, New York, N. Y., a corporation of Delaware Application March 19, 1931. Serial No. 523,680

3 Claims. (Cl. 137—53)

This invention pertains to spring-loaded safety valves such as are employed on steam boilers, compressed air tanks, oil stills, etc., and relates more particularly to improvements providing a valve wherein the valve disk or feather will rise from its seat to full lift without substantial simmer, and will close sharply without exceeding the allowable blow-down, and wherein the desired result is attained by the use of few and simple parts, including for example, a single blow-down ring of usual type. In modern engineering practice where very high pressures are often encountered and where safety valves must be designed to deliver large volumes of the pressure fluid, it is highly desirable, in order to avoid undue multiplication of valves, or excessive size in the valve parts, to have the valves open substantially to full bore capacity, and this under ordinary circumstances necessitates a high lift of the valve or feather from its seat. On the other hand, it is desirable that the valve pop or open sharply and without prolonged simmer and that it close abruptly when the pressure has fallen to a predetermined blow-down point. The latter requisite is especially important in view of the insistent demand of users, and of the engineering profession, that the blow-down be kept as low as possible, 2% blow-down often to be considered as a permissible minimum.

Various attempts have heretofore been made to attain the desired accuracy of operation (both at opening and closing) with the high lift desired. Theoretically, if the effective lift pressure, that is to say, the difference between the steam pressure and the external load (including the weight of the valve), be the same at all lifts, the valve should rise to full lift as soon as the predetermined opening pressure is attained and when the effective pressure, as above defined, has dropped to zero, the valve should drop at once to its seat, since, if the pressure of the escaping fluid is insufficient to hold the valve open in one position, it will likewise be insufficient to hold the valve open at any position. Certain efforts have been made to attain this theoretical condition as, for example, by providing the valve and its seat, or the blow-down ring, with surfaces of a peculiar and mathematically calculated curved contour, but as a practical matter such constructions are of little value, first, because they require extreme accuracy and care in manufacture, which adds prohibitively to the cost and, secondly and more important, because it is substantially impossible to maintain the desired accuracy during use, the resurfacing of the parts, which is frequently necessitated by erosion or wear, being usually done in repair shops unprovided with machinery or skilled mechanics necessary to produce such accurate results. Accordingly, usual practice is to employ ring and valve seat surfaces of simple type, for example, conical or cylindrical,—the shape of the parts being such as in most cases to represent a compromise between the conditions best suited to secure prompt opening with high lift and sharp closure at a predetermined blow-down pressure.

As stated, it is well understood by those skilled in the art that high lift with prompt opening may readily be obtained by the use of simple and known expedients but, it is not so easy to combine therewith sharp closing at the desired blow-down pressure without prolonged hang up. Accordingly, the present invention has for one object the provision of means whereby, although the usual valve seat and blow-down ring are employed and arranged for sharp opening and high lift, the valve may be returned to its seat without hang up and at substantially the exact blow-down pressure desired. To this end I provide in a very simple and inexpensive manner for building up fluid pressure behind the valve at the time the valve begins to drop toward its seat in such a way as to assist the loading spring or weight in fully closing the valve, the arrangement preferably being such that the additional closing pressure will increase in intensity as the valve approaches its seat, thus neutralizing any increase in pressure between the valve feather and the blow-down ring due to throttling which might oppose closing.

While I am aware that certain proposals have been made to control the escape of steam entering a back pressure chamber behind the valve, as by the use of an adjustable needle valve or the like, such prior proposals have involved the delivery of steam to such back pressure chamber from a source of irregularly varying pressure thus making the control extremely uncertain. On the other hand, I obtain the necessary pressure fluid by providing passages from the huddling chamber wherein the pressure varies at a substantial constant ratio with reference to the pressure of the fluid flowing from the boiler through the valve seat, and precalculate the size of the escape port so that no manual adjustment is necessary or possible, thus avoiding tampering or maladjustment by unqualified persons.

It has also been proposed to employ the entire spring housing as a back pressure chamber into which steam is allowed to leak and from which it is allowed to escape in a regulated manner but this is very undesirable since the spring is thus exposed to the hot steam and moisture which causes rapid deterioration. The present invention avoids this difficulty by providing a back pressure chamber independent of the spring and from which the pressure fluid is exhausted directly into the open air.

When a safety valve of the class described is provided with a lateral outlet passage, it has been noted that the valve disk tends to wear and to score the seat bushing at that side from which the outlet passage extends, and after much research this has been found to be caused by the unsymmetrical shape of the part of the valve casing which guides the valve disk or which supports the disk-guiding element. In accordance with the present invention this defect has been wholly overcome by providing a symmetrical bearing surface of substantial length axially of the valve disk for the reception of the disk-guiding sleeve so that the latter is accurately centered and positioned, thereby preventing lateral cocking of the disk with consequent wear.

In the accompanying drawing I have illustrated one desirable embodiment of the invention by way of example and in the drawing:

Fig. 1 is a vertical section through a safety valve of a usual type but modified to embody the present invention, the valve being shown as fully closed;

Fig. 2 is a fragmentary view showing the lower portion of the valve casing of Fig. 1 and indicating the valve as fully open;

Fig. 3 is a diagram illustrating possible relations of valve lifts to the area of the outlet port from the back pressure chamber; and Fig. 4 is a diagrammatic reproduction, to smaller scale, of an actual lift card produced by the improved valve.

Referring to the drawing the numeral 1 designates the lower part of the valve casing, such casing having the inlet 2 directly communicating with the boiler or other source of pressure fluid and having the outlet 3 which may be connected to an exhaust pipe or which may lead directly to the open atmosphere. An annular valve seat 4 is arranged concentric with the inlet passage 2, such seat preferably being carried by a supporting bushing 5 of the type disclosed in the patent to Graesser et al. No. 1,668,453, dated May 1, 1928. The valve casing also comprises the upper member 6 secured to the lower part 1 in any desired manner, as for example, by bolts, such upper part comprising the upwardly projecting yoke 7 forming an open housing or guard for the loading spring.

To insure accuracy of operation of the valve and to avoid undue wear of the valve feather and seat, the valve casing is furnished with a relatively heavy ring-like portion 1$^a$ symmetrical with reference to the axis of the valve seat and of substantial length in the axial direction. This part 1$^a$ receives the fixed sleeve-like guide 8 having a cylindrical body portion and which bears against the member 1$^a$ at the spaced points 8$^a$ and 8$^b$ so that the guide is accurately held in coaxial relation to the valve seat. This guide 8 as here shown is provided with the integral top member 10 having a central fluid delivery orifice axially aligned with the valve seat. Preferably the actual orifice 11 is defined by a laterally movable annulus 10$^a$ of any suitable material. This annulus 10$^a$ may be retained in position in any desired manner, for example, by seating it in a recess in the top 10 and confining it therein by means of a screw-threaded ring 10$^b$. The valve stem or spindle 12 passes through the orifice 11 in the annulus 10$^a$ and as the annulus is free to move slightly in a lateral direction, danger of binding between the spindle and annulus is thus avoided. The lower end of the valve stem or spindle preferably engages a cavity in the inner surface of the valve feather or disk 13, the latter having a cylindrical body portion 13$^a$ which has a sliding fit in the guide 8, the guide and the valve feather defining a back pressure chamber. The upper part 9 of this chamber is just beneath the top 10 of the guide and between the latter and a valve lifting nut 14 which has screw-threaded engagement with the upper part of the valve body 13$^a$.

A pin 15 transmits movement from the valve stem to the valve. The valve stem passes with some clearance through the nut 14, and above the cover 10 is provided with a shoulder 16 upon which rests the lower spring abutment 18 which also constitutes a guard for shielding the spring from fluid escaping through the orifice 11. The upper end of the loading spring 19 engages the upper abutment 20 which is adjustable by means of the screw-threaded sleeve 20$^a$, the latter forming a sliding bearing for the upper end of the valve spindle. Usual means for manually lifting the spindle and the valve may be provided if desired.

The valve feather 13 is preferably provided with an overhang 21 spaced from the upper surface of the valve seat bushing 5 to provide a huddling chamber 22. A vertically adjustable blow-down ring 23, preferably having screw-threaded engagement with the bushing 5 is disposed in concentric relation to the valve seat, and this blow-down ring has an inner surface 24 here shown as conical and flaring upwardly and outwardly. If desired, the lower part of the valve body may be furnished with a conical upwardly divergent surface 25 cooperating with the surface 24 of the blow-down ring to control the steam escaping from beneath the valve feather. These parts are so constructed and shaped in accordance with well known practice and usage as to ensure prompt opening of the valve to full lift upon the attainment of the desired predetermined pressure in the boiler.

In order to ensure prompt closure of the valve, substantially irrespective of the shape of the blow-down ring and associated parts, I provide a passage or passages 26 leading preferably from the huddling chamber 22 into the back pressure chamber, the lower part of which may be considered as including the interior of the hollow cylindrical valve body 13$^a$. From a thermodynamic view-point the expansion of steam in passing from within the bushing 5 to the space within the casing at the discharge side of the valve may be regarded as a flow through a nozzle, and this flow may be figured by Napier's formula for flow, except under unusual conditions. The pressure in the huddling chamber is a function of the pressure between that within the bushing 5 and that at the upper edge of the blow-down ring, the latter pressure being governed by the size of the ring and the position of adjustment. Since the pressure in the huddling chamber is a function of a differential between the pressure in the bushing and the pressure at the outlet of the blow-down ring, the pressure in the huddling chamber has a definite relation to both of the other pressures and thus the pressure in the huddling chamber is more nearly a constant with respect to the pressure in the bushing than to that at the outlet side of the valve. Thus, an orifice or passage extending from the huddling chamber will tend to deliver steam into the back pressure chamber at a pressure which bears substantially constant ratio to that of the steam flowing through the bushing 5, and so as respects any given pressure within the bushing 5, it is possible to establish a substantially predetermined pressure within the back pressure chamber.

In order to regulate the discharge of pressure fluid from the back pressure chamber in a useful way, such as to employ the back pressure in controlling the closure of the valve, I provide means conveniently actuable by movement of the valve stem, for varying the outlet orifice 11. Thus, for example, I provide the valve stem with a substantially cylindrical enlargement 28 constituting a controlling member which fits within the orifice 11 and which is arranged (in accordance with the preferred mode of operation) either to close or partially close said orifice when the valve feather is on its seat and in fact during a substantial part of the upward movement of the valve feather. Below the cylindrical part 28 is a part 27 of reduced diameter, here shown as having a peripheral surface which is beveled or tapered downwardly and so arranged that when the valve feather is at or near full lift, the part 27 is disposed within the orifice 11, thus affording an escape passage of substantial capacity from the back pressure chamber. It is obvious that by varying the position and the taper of the part 27, different ratios of area of outlet orifice to the per cent of valve lift may be obtained, such variations in ratio being indicated diagrammatically in Fig. 3.

In the operation of the device, it being assumed that the taper of part 27 has been properly designed, either through theoretical considerations or empirically, with reference to the area of the inlet passage 26 and the fluid pressure in the bushing 5, and that the predetermined opening pressure has been attained, the boiler pressure, acting against the lower surface of the valve feather 13, will lift the valve slightly from its seat sufficiently to permit steam to enter the huddling chamber, whereupon pressure builds up therein which assists in lifting the valve promptly to full lift, the shape of the inner surface of the blow-down ring being such as to insure this action. As the valve blows, the pressure is gradually reduced until it reaches a point such that the loading spring 19 is able to move the valve slightly toward its seat. As the valve stem thus moves down, even slightly, the outlet orifice 11 from the back pressure chamber will be slightly reduced in area, as compared with its maximum opening while the valve is in its uppermost position. When the valve first begins to blow, steam from the huddling chamber at high pressure enters the back pressure chamber but flows out through the orifice 11 without substantial restriction. However, when the valve starts to return to its seat, as above noted, and the orifice 11 is even slightly restricted, pressure immediately begins to build up in the back pressure chamber and this back pressure, acting upon the valve feather, assists spring 19 in closing the valve, it being evident that if the pressure beneath the valve has dropped sufficiently to enable the spring to move the valve even slightly toward its seat, any additional pressure acting to assist the spring will cause immediate and sudden closure of the valve. The typical operation of such a valve is shown by the indicator card illustrated in Fig. 4, wherein it will be noted, (as shown at the left-hand side of the figure), that at popping pressure (450 lbs.) the valve rises very suddenly to full open position and possibly slightly beyond the desired maximum opening as indicated by the cusp of the curve at the extreme left. The valve then slowly returns toward its seat until in this typical case the boiler pressure has dropped to 432 lbs. At this point, the loading spring pressure, assisted by the back pressure very suddenly restores the valve to closed position thus giving a blow-down of approximately 4%.

Obviously various changes in proportion of parts and in specific arrangement thereof may be made without departing from the spirit of the invention, it being contemplated, among other things, that the part 27 may be tapered to different degrees, and have either a straight or a curved surface,—and that the orifice 11 may be closed by movement of some other means than a part directly carried by the valve spindle. While the valve, as thus constructed provides for a prompt and sharp closure at the desired blow-down pressure, this result is accomplished without undue complication of parts and no adjustments other than usual resettings of the blow-down ring are required during the life of the valve. Since no adjustment is provided it is impossible for unauthorized persons to interfere with the proper operation of the valve and on the other hand since the blow-down ring, the valve feather and the valve seat are of simple and usual construction employing conical or cylindrical surfaces (that is surfaces having rectilinear elements), it is possible to resurface these parts in the usual repair shops and by usually available tools without destroying the valuable characteristics of the valve as determined by its maker.

In describing the construction herein illustrated, I have made frequent use of the expressions "vertically" and "up and down" as conveniently describing the relations of parts or of the flow of the pressure fluid, but it is to be understood that these terms have been used merely with reference to the illustrated embodiment of the invention in a vertically upright valve, and that they are to be understood merely as descriptive and not as limiting the invention in these respects. I have also referred to "steam" as the pressure fluid, for convenience in description, but without any intent to limit the use of the valve for controlling steam pressures. I further contemplate that various changes in shape and proportion of parts and the substitution of equivalents may be made without departing from the spirit of the invention, and wish particularly to point out, if the valve seat be integral with the valve casing 1 or otherwise supported, that the blow-down ring and other associated parts will be arranged in a correspondingly appropriate manner.

I claim:

1. A safety valve device comprising a casing provided with a valve seat and means defining a back pressure chamber, said means including a cylindrical guide sleeve coaxial with the valve seat, a fixed cover for the upper end of said chamber and a valve having a feather cooperating with the seat and comprising a part sliding in said guide, the valve constituting a movable bottom for said chamber, valve loading means wholly outside of the back pressure chamber, a fixed cover member having an opening therethrough and a concentric recess, a laterally movable annulus in said recess, said annulus defining an outlet orifice, a valve stem extending through the orifice in the annulus from the valve to the valve loading means, a blow-down ring coaxial with the seat, the inner surface of said blow-down ring comprising rectilinear elements, said surface cooperating with the feather and valve seat to provide prompt opening of the valve and high lift, and means arranged to admit pressure fluid to the back pressure chamber so long as the valve is open, the valve stem comprising a portion normally obstructing said orifice in said annulus but adapted as the valve stem moves to open said orifice progressively whereby to regulate the escape of pressure fluid from the back pressure chamber and thus insure sharp closure of the valve at predetermined blow-down pressure.

2. A safety valve device comprising a casing provided with a valve seat and means defining a back pressure chamber, said means including a fixed cylindrical guide sleeve coaxial with the valve seat, a fixed cover for the upper end of said chamber, and a valve having a feather cooperating with the seat and a part slidably engaging said cylindrical guide sleeve, the valve constituting a movable bottom for said chamber, a spring housing above said cover member, a valve loading spring in said housing, a valve stem extending from the valve outwardly through an orifice in said cover member, said stem having a shoulder, a lower spring abutment engaging the shoulder on the valve stem, said abutment constituting a guard shield for the spring to prevent contact of pressure fluid therewith, the valve having a feather cooperating with the valve seat and shaped to provide a peripherally open and unobstructed huddling chamber, a blow-down ring coaxial with the seat, said feather and ring having cooperating surfaces arranged to provide for prompt opening and high lift, the valve feather having a passage leading from the huddling chamber into the back pressure chamber and adapted to deliver pressure fluid to the latter so long as the valve is open, and a controlling member carried by the valve stem at a point intermediate the ends of the latter, said controlling member comprising a member normally disposed within the orifice in the cover member and terminating at its lower end in a tapering portion merging into a part of a diameter substantially less than that of the orifice, said controlling member moving with the valve stem as the valve lifts so as to provide free escape for pressure fluid through the orifice from the back pressure chamber but restricting said orifice as soon as the valve starts to return to its seat, after blowing, whereby to build up back pressure in the back pressure chamber thereby to assist the spring in closing the valve.

3. A valve of the class described having a casing enclosing a valve seat, said casing comprising an upper part and a lower part, the latter having an outlet passage whose axis is at an angle to the axis of the valve seat, the lower part of the casing also having a heavy integral rigid annulus of substantially uniform transverse thickness and of substantial length, said annulus being coaxial with the valve seat, a hollow cylindrical valve guide provided with spaced external ribs engaging the annulus adjacent to the upper and lower ends respectively of the latter and accurately positioned thereby, and a valve feather cooperable with the seat and having a body portion adapted to slide within said guide.

ALBERT D. EPLETT.